United States Patent [19]

Pointon

[11] 4,391,853
[45] Jul. 5, 1983

[54] METHODS OF MAKING ADHESIVE ARTICLES AND RESULTING PRODUCTS

[75] Inventor: David W. Pointon, Sparks, Nev.

[73] Assignee: The Datak Corporation, Guttenberg, N.J.

[21] Appl. No.: 101,782

[22] Filed: Dec. 10, 1979

[51] Int. Cl.³ .......................... B41M 3/12; B44C 1/16
[52] U.S. Cl. .................................. 427/152; 156/231; 156/234; 156/239; 156/240; 156/249; 156/278; 156/279; 156/283; 156/308.2; 156/308.4; 156/309.3; 156/324.4; 427/118; 427/202; 427/207.1; 427/208.6; 427/208.8; 427/258; 427/261; 427/265; 427/286; 427/333; 427/386; 428/42; 428/195; 428/202; 428/914
[58] Field of Search ................ 156/90, 234, 240, 313, 156/177, 230, 231, 237, 239, 242, 243, 246, 247, 249, 250, 252, 268, 277, 278, 279, 283, 289, 297, 308.2, 308.4, 309.3, 324.4, 326, 332, 344; 427/146–148, 150, 152, 207 B, 207 C, 207 D, 286, 333, 117, 118, 180, 202, 203, 207.1, 208.4, 208.6, 208.8, 258, 261, 265, 340, 375, 386, 407.1, 412.1–412.5; 428/195, 206, 207, 201–204, 207, 352, 356, 913, 914, 40–42, 323, 327

[56] References Cited

U.S. PATENT DOCUMENTS 2,567,067  9/1951  Grupp et al. .................... 117/3.6
3,129,816  4/1964  Bond et al. ...................... 428/356
3,298,850  1/1967  Reed et al. ..................... 428/191

Primary Examiner—Bruce H. Hess

[57] ABSTRACT

The disclosed adhesive products include a carrier sheet bearing a polymeric film and an adhesive layer, overlying the film as in dry transfers or underlying the film in products such as wire markers and other labels, or there may be adhesive layers both over and underneath the polymeric film. A constituent initially contained in the polymeric film layer migrates into an ordinarily non-tacky precursor of the adhesive layer, thereby rendering the precursor tacky. The precursor layer becomes adhesive only where it is opposite the polymeric film, being non-tacky outside the area of the film. In important applications, the common area of film and adhesive layers does not cover the whole carrier sheet. Both the adhesive precursor layer and the polymeric film may include portions extending outside the common area.

48 Claims, 10 Drawing Figures

METHODS OF MAKING ADHESIVE ARTICLES AND RESULTING PRODUCTS

The present invention relates to adhesive products and to methods of making them. The invention provides distinctive improvements to wire markers as well as labels generally, to dry transfers, to doubly adhesive tape and to other adhesive products.

BACKGROUND OF THE INVENTION

1. Dry Transfers

Dry Transfers typically consist of a carrier sheet bearing transfer elements such as symbols, characters or other discrete shapes of film and low-tack adhesive on the film shapes. Dry transfers are distinguished from other transfers which require water or other solvent or heat for releasing the transfer elements from the carrier sheet and for adherence of the transfer elements to the receiving surface. U.S. Pat. No. 3,013,917, issued Dec. 19, 1961, to M. Karlan et al, and U.S. Pat. No. 3,131,106 issued Apr. 28, 1964 to F. W. McKenzie disclose typical dry transfers. During nearly two decades, dry transfers have been produced by silk-screening plural areas of film in discrete shapes, especially symbols or characters, on a common carrier sheet having release properties, and silk-screening or otherwise coating low-tack adhesive on the film shapes. It is impractical in production to depend on precisely registering or aligning the outlines of the film shapes and the outlines of the adhesive, and therefore it has been usual practice to have the adhesive extend beyond the film shapes as "overlap" onto the carrier sheet. The overlap adhesive has the desirable purpose of retaining the film shapes in position on the carrier sheet, guarding against premature separation in case the sheet is subjected to such rough handling as to break the weak bond between the film shapes and the carrier sheet.

Dry transfers are used by locating a desired transfer element, adhesive-side down, on a selected area of a receiving surface. The carrier sheet is pellucid, that is, sufficiently transparent for this purpose. The adhesive has such limited tack that it does not adhere on contact, so that the sheet can be moved about to adjust a selected transfer element to exactly the right position on the receiving surface. The selected area of the dry transfer sheet is commonly stroked as with a ball-point pen so that a secure adhesive bond is made between the selected transfer element and the receiving surface. The transfer element is released from the carrier sheet either as a result of the mechanical effect of the stroking operation (due perhaps to greater distortion of the carrier sheet than the film shape) or as a result of a so-called "tug of war" between the newly established adhesive bond to the receiving surface and the weaker bond of the film shape to the carrier sheet.

The adhesive has a stronger bond to the carrier sheet in the overlap areas, around the outlines of the film shapes. There is a tendency of some "overlap" adhesive to transfer to the receiving surface, due to weakness of the adhesive-to-carrier bond, due to ragged tearing of the adhesive around the outline of the transferred film, or due to transfer of part of the thickness of the overlap adhesive. Ball-point pen pressure may develop a strong bond to the receiving surface. Transferred adhesive is exposed on the receiving surface so that it picks up dirt. One effort at eliminating the problem is disclosed in U.S. Pat. No. 3,298,850, issued Jan. 17, 1967 to K. J. Reed et al. It is proposed there that the adhesive should react with the carrier sheet in the overlap areas where they are in contact so as to nullify the adhesive quality. This approach seems to have had only limited success, perhaps due to practical limitations of the processes and materials involved. A second problem connected with the "overlap" adhesive is that where it does adhere securely to the carrier sheet, it tends to secure the outline of the film shape to the carrier sheet and thus it impedes the transfer operation. This problem normally is met by incorporating a so-called "shear agent" into the adhesive. When a layer of adhesive containing a shear agent is bonded to the carrier sheet, it tends to shear readily along the outline of the film shape that is newly bonded to the receptor sheet. In any case, the formulation of the adhesive with proper shear properties and the proper degree of tack and with qualities intended to limit transfer of overlap adhesive complicates the manufacture of dry transfers.

2. Adhesive Patches, Especially Wire Markers and other Labels

A common form of wire markers are strips of polymeric tape, each usually being over-printed with repetitions of a wire-identifying character, having a coating of tacky adhesive covered by a protective peel-off backing strip. For various reasons, the selling price of wire markers is substantial. In one form, they are available as individual die-cut units, and it is often tricky to separate the backing strip from the wire marker because the edges of the backing and the marking strip coincide. At times, permanently tacky labels like wire markers are produced by a sequence of operations that involves producing overall coatings of adhesive and polymeric film-forming material on a backing sheet, optionally overprinting designs or characters on the film, separately die-cutting areas of the film to form the labels without cutting through the backing sheet, and removing unwanted areas of film and adhesive around the labels. In that case each label occupies less than the whole area of the backing sheet. The label is peeled from the backing sheet and applied to the receiving surface. Production of labels, particularly wire markers that can be parted readily from their backing, involves inherently costly manufacturing procedures.

Wire markers involve special problems. They may be used in electrical equipment that is at times exposed to high temperatures. Possibly because of heat-induced evolution of constituents of the adhesive, wire markers tend to dry out, loosen, and even fall off. Such deterioration jeopardizes the intended identification of the wires. Another problem may occur. Plasticizer from the wire insulation and/or from the film may migrate into the adhesive so as to render the adhesive "sloppy." Such "sloppy" adhesive may allow the wire marker to slide, and it may also ooze outside the wire marker.

3. General

The manufacture of many kinds of adhesive products involves application of a tacky adhesive to a carrier sheet. The term "carrier" or "carrier sheet" signifies a sheet (including film, strip, etc.) having a release surface, whether itself having release properties or treated to impart release properties. Dry transfers and adhesive labels as described above are two examples of such adhesive products. Double-faced adhesive tape on a carrier strip is another such product.

Due to "rewetting" there is a strong tendency for a second-applied layer to lift a first-applied layer away from the carrier sheet. There is also a tendency of the second-applied layer, when being applied by the silk-screen process, to adhere to the silk screen unless the operation is done quickly.

A further difficulty arises where the carrier bearing an exposed layer of more-or-less tacky adhesive is to be stacked or rolled, later to have a film coating or a laminate applied, or having applied films which only partly cover the tacky adhesive layer. Such carriers with exposed tacky adhesive cannot be stacked or rolled unless release slip sheets are used to cover the tacky adhesive or unless the backs of the adhesive-coated carriers are treated to avoid completely the formation of a bond to exposed adhesive on the confronting carrier in the stack or roll.

SUMMARY OF THE INVENTION

An object of the present invention resides in providing novel pressure-sensitive adhesive articles on carriers, and in providing methods of producing such products, so as to avoid or ameliorate one or more of the foregoing and other problems and limitations. Other objects, novel features and advantages will become apparent.

As is described below, a release surface of a carrier is provided with plural layers including a layer of non-tacky precursor of a pressure-sensitive adhesive and one or more layers of non-tacky coherent polymeric film. A tackifying amount of tackifier for the precursor layer is initially present in the polymeric film and migrates into the adhesive precursor layer, rendering the precursor layer tacky. The polymeric film remains non-tacky. In a broadly equivalent system but at added cost, a further layer may be incorporated between the film and the adhesive precursor, the tackifier being provided initially in the film and/or the further layer.

In one aspect of the invention, the above-described layers are not coextensive, and the tackifying migration is confined to the common area of the adhesive precursor and the layer containing the tackifier. Regardless of which of these two layers is formed first, tacky adhesive develops only in the common area of these two layers. Ordinarily the tackifier is a plasticizer present in the coherent polymeric film.

Features of the invention apply to manufacture of wire markers and other labels and similar products where the coherent polymeric film containing migratory tackifier is applied over the initially non-tacky adhesive precursor layer on the carrier. After the non-tacky adhesive precursor layer has been formed and before the coherent polymeric film is applied thereover, there is no exposed tacky adhesive surface. Where the coherent polymeric film is applied as a partial cover over the adhesive precursor layer leaving uncovered areas of the latter layer, once again there is no exposed tacky adhesive surface. In both cases, there is no need for a slipsheet or other protection against one sheet of a stack or one convolution of a roll adhering to another during or after manufacture.

Following teachings of this invention, the coherent tackifier-containing polymeric film formulation and the adhesive precursor formulation are individually stable for extended periods of time, tackifier migration and tackiness in the precursor layer developing only where the layers are opposed and where they accommodate such migration. Further, in one aspect of this invention, the material serving as the tackifier is one which is compatible with, i.e. readily miscible with, or in a sense soluble in, both the adhesive precursor layer and the layer that initially contains the tackifier. This characteristic has been found in many plasticizers of polymeric films, generally but not exclusively where the plasticizer is of low molecular weight, i.e. a molecular weight of up to about 500. Considering only the adhesive precursor layer and the layer initially containing the tackifier, migration of the tackifier proceeds to equilibrium at which point the tackiness of the adhesive layer reaches its limit, thus developing the desired degree of tackiness or "tack." The concentration of the tackifier in the tackified adhesive layer, determinative of the tack developed therein is governed by the "partition" effect, discussed more fully below.

In various examples appearing below, a volatile solvent may be part of the adhesive precursor layer or it may be part of each layer as applied, or volatile solvent may not be a constituent of either applied layer. Where neither layer contains a volatile solvent, it is self-evident that migration of the tackifier occurs without dependence on, and in the absence of, volatile solvent. Where a PVC dispersion resin is applied as the film former onto a previously dried adhesive precursor, and it is then heated to gel and fuse it, volatile solvent is essentially lacking as equilibrium is reached in the migration of the tackifier, ending in a tackified adhesive precursor layer. In Example 6 (below), where each layer as applied contains volatile solvent, the first-applied layer is dried, and the next layer is applied and dried to eliminate the volatile solvent; and in that example the layer having a formulation that of itself forms a non-tacky adhesive precursor, becomes tacky during migration of the tackifier and is tacky at equilibrium. It is evident that tackifier migration to equilibrium is not dependent on the presence of volatile solvent and is attained in the absence of volatile solvent.

The polymeric film can extend beyond the common area of the film and the adhesive precursor layer, in which case the article comprising an adhesive coated film has a non-adhesive tab area available to assist in peeling the article away from its carrier and for handling when applying the adhesive article to a receiving surface (receptor).

In a notable application of one aspect of the invention, the film is a vinyl polymer containing a plasticizer, a portion of which migrates into the adhesive precursor to render it tacky. When this system is used in making labels, wire markers and similar articles as well as dry transfers, and such vinyl-film adhesive elements are applied to a vinyl receptor such as vinyl-insulated wire or a vinyl sheet, an unusually secure bond develops so that they become unified with the receptor. This appears to be due to the continuously available plasticizer, not only in the film but also in the receptor, resisting the effects of limited evolution of the plasticizer that may be volatile to some extent. It was found that, after a novel vinyl-film wire marker made according to the invention was applied to vinyl-insulated wire, and subjected to moderate heat, the marker and the wire insulation became remarkably unified, yet "sloppiness" and oozing of adhesive did not develop. The same effect occurs more slowly at room temperature, both for wire markers and for dry transfers where both the receptor and the novel adhesive elements have a basis of vinyl polymer. This effect is discussed below.

The film is advantageously laid down in a silk-screen operation, particularly (as in making dry transfers and labels) where many discrete areas of film are to be provided on a carrier sheet. However, in concept, die-cut areas of film containing a migratory constituent as described can be applied to a carrier sheet or a freshly deposited broad area of adhesive precursor layer, and many of the described advantages are realized. Notably, where areas of adhesive precursor layer overlap the carrier outside the areas of the polymeric films, such "overlap" precursor is not rendered tacky. Many sheets of the kind having film areas that cover the tackified layer in common areas may also have areas of the adhesive precursor layer outside those common areas. Such sheets can be stacked without using interleaved separator sheets because the exposed areas of adhesive precursor layer outside the film areas remain non-tacky.

Whether the film areas are laid down by silk-screening, die-cutting, or other printing, coating, or laminating method, various objectionable effects that might occur can be avoided by limiting the thickness of the coherent polymeric layer. Certain coherent polymeric films tend to shrink due to relief of internal stress, aging, etc., and if the film is thick enough to overcome the holding power of the adhesive, an unsightly dirt-catching margin of tacky adhesive could be developed around or along the outline of the film, as where letter shapes are involved. Also, "alligator" wrinkling of an unduly thick film can occur where the film and the carrier sheet expand or shrink differently. These disadvantages are avoided where the film is thin enough or the strength of the adhesive layer is great enough for the adhesive strength to dominate the film dimensions. Handling discrete die-cut areas of such thin film is quite difficult. Silk-screening produces the desired shapes of film and lays them down at the desired locations, all in one operation.

As applied to dry transfers, the invention in broad aspect avoids the problem of overlap by ensuring registration of the outlines of character films and their adhesive layers. Where the adhesive precursor layer overlaps the carrier sheet outside the area of the film, the "overlap" adhesive precursor remains non-tacky and there is no transfer of adhesive to the receiving surface around the transferred character. The adhesive precursor can be applied to the entire face of the character-bearing sheet without concern for adhesive "overlap." Use of a shear agent in the adhesive precursor becomes optional, because the desired shear properties can be attained by choosing adhesive precursors that need no shear-promoting constituent.

The preferred process involves laying down discrete areas of the film-forming layer by a silk-screen printing operation. This avoids all problems related to prior-art manufacturing procedures that depend on die-cutting. However, it is difficult to silk-screen a film-forming layer on a layer of tacky adhesive on a release surface of a carrier sheet. This is because the film-forming layer tends to lift the adhesive layer from the carrier sheet. In fact, printing or coating a wet ink or other wet film forming formulation onto a soft, sticky, tacky and/or adhesive surface always presents significant problems. Similarly, when a tacky adhesive layer is being silk-screened onto a film on a release surface of a carrier sheet, the film tends to be peeled away from the carrier sheet. The present invention avoids these difficulties.

The adhesive precursor layer is a material that becomes a pressure-sensitive adhesive upon addition of tackifier. It may contain no tackifier initially or an amount of tackifier insufficient to render it tacky and it may contain a detackifying agent such as shear-promoting agents. Any tackifier present initially in the adhesive precursor should also be limited so that, after the adhesive layer absorbs the migratory tackifier, it attains the desired degree of tack. It should not become "sloppy" (not more than slightly tacky in dry transfers) as a result of its total content of tackifier at equilibrium. The preferred formulations (below) of the adhesive precursor are not per se adhesives but are rendered adhesive or tacky by a migratory constituent (tackifier). If a film-forming resin is used as the adhesive precursor, and the precursor layer overlaps the polymeric film layer, it is advisable to include a shear agent. Where the coherent polymeric film contains the migratory tackifying constituent, such tackifier is generally a plasticizer present initially in a limited amount sufficient for the coherent film to be pliable but not tacky, both as a first-applied layer and, when applied to an adhesive precursor, after outward migration of the tackifier therefrom ceases at equilibrium. Both a migratory and a non-migratory plasticizer may be used instead of a larger concentration of migratory tackifier/plasticizer alone in case the total amount of plasticizer used for rendering the coherent polymer film pliable would render the adhesive more tacky when desired.

The factors that enter into the "distribution" or "partition" effect are readily controllable, and consequently the instant novel adhesive products can have a high degree of uniformity without unduly exacting production control. The concentration of the migratory tackifier constituent in the adhesive precursor layer at equilibrium tends to be substantially consistent in product after product employing the same materials and thicknesses of layers.

It was noted above that, when a novel wire marker having a basis in vinyl polymer is applied to wire having vinyl polymer insulation, an unusually secure bond unifies the insulation and the film. Plasticizer in the vinyl insulation is continuously available to migrate into the adhesive layer, yet "sloppiness" does not develop. It would seem that usual wire markers having tacky rubber-base adhesives are tacky due to their formulation with non-migratory high molecular weight tackifiers. When applied to vinyl polymer insulation that conventionally contains DEHP (di-2-ethyl-hexylphthalate) as a plasticizer having a low molecular weight, the DEHP migrates into the adhesive which contains non-migratory tackifier. The DEHP acts as additional tackifier, rendering the adhesive "sloppy." This effect is avoided with the novel wire markers, a result which I explain as follows. There is a continual migration of migratory tackifier into and out of the adhesive layer from the two vinyl layers, i.e., the wire marker and the wire insulation. The total concentration of migratory plasticizer/tackifier in the adhesive is self-limiting and moderate. The concentration of tackifier in the adhesive layer is governed by the "partition" effect. This effect is discussed below in relation to a two-layer system, but it also applies, only slightly modified, to the three-layer system of a novel wire marker comprising an adhesive layer on a polymeric film applied to polymeric wire insulation, in particular when the film of the wire marker and the wire insulation both have a basis of vinyl polymer.

Considering only the wire insulation and the adhesive layer as a two-layer system, under the theory of the partition effect one might expect the concentration of plasticizer/tackifier in the adhesive layer to be very high at equilibrium due to the relatively great thickness of the vinyl insulation in contrast to the relatively thin adhesive layer. However, the usual concentration of DEHP or other migratory (low molecular weight) plasticizer in the insulation is much lower than the concentration of DEHP or other tackifier in examples given below of film formulations. Equilibrium is attained between tackifier migrating from the insulation into the adhesive and from the adhesive layer into the insulation. The resulting concentration of tackifier in the adhesive layer produces a particularly strong bond, unifying the insulation and the film of the novel wire marker.

In this process, the plasticizer/tackifier in the film of the novel wire marker also enters into the equilibrium. Even where specifically different migratory plasticizers are present in the polymeric wire marker and the polymeric wire insulation, the total concentration of low molecular weight plasticizers that migrate from both polymers into the adhesive layer and out of the adhesive layer is still self-limiting, substantially below the concentration characterizing a sloppy adhesive. The wire insulation may even cause reduction of the concentration of migratory tackifier in the adhesive, thereby rendering the adhesive harder and strengthening the adhesive bond of the polymeric film to the insulation. The "activity coefficient" principle apparently comes into play where different migratory tackifiers (plasticizers) are present in the polymeric film and in the polymeric insulation. The tackifier/plasticizer in the adhesive layer that came from the wire-marker polymeric film tends to depress migration of plasticizer into the adhesive layer from the polymeric insulation of the wire.

The foregoing discussion is also believed to be applicable to the present dry transfers when applied to a sheet or other receptor of a polymer containing a migratory plasticizer that also acts as a tackifier. Where both the cohesive polymer film of the dry transfer and the receptor have a basis of vinyl polymer and both contain plasticizer acting as migratory tackifier for the adhesive layer of the dry transfer, a particularly strong bond develops.

The "partition" effect mentioned above becomes operative in producing the instant novel adhesive products using any of a wide range of different coherent film-forming materials, adhesive precursors, and migratory tackifiers. As will be seen, certain related materials and products which are described below as illustrative embodiments have their own distinctive advantages, representing further aspects of the invention. The nature of the invention in its various aspects, the novel features and their advantages will be better understood from the following detailed description of the illustrative embodiments. The accompanying drawings represent structural features of some of the products to which the broad aspects of the invention apply.

ILLUSTRATIVE EMBODIMENTS OF THE INVENTION

Figure 1:
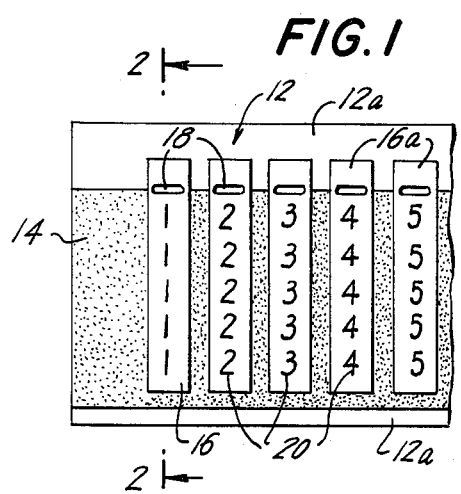
FIG. 1 is a fragmentary plan view of a sheet of novel wire markers.
Figures 2, 5A:
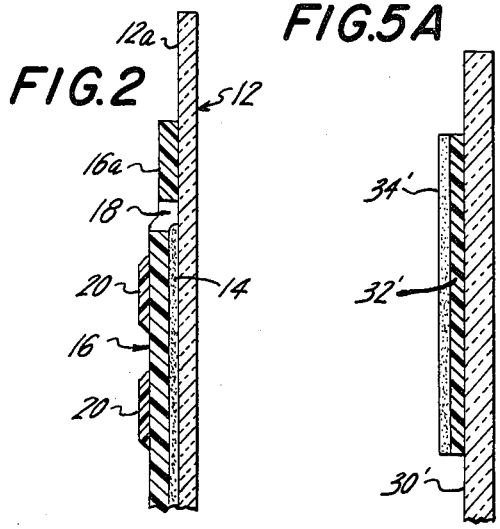
FIG. 2 is an enlarged fragmentary cross-sectional detail of FIG. 1 viewed at the plane 2—2 in FIG. 1.
FIG. 5A is an enlarged cross-section of a modification of the embodiment in FIG. 5.

In FIGS. 1 and 2, which illustrate a wire marker, carrier sheet 12 has release properties enabling the applied articles to be peeled away readily. An adhesive precursor layer 14 can be roller-coated over a broad area of sheet 12, leaving bare marginal areas 12a. After layer 14 has solidified, a pattern of strips 16 of coherent polymeric film-forming materials is silk-screened onto layer 14, leaving a weakening aperture 18 in each strip at a margin of adhesive precursor layer 14. The margin is such that when the used strip is finally broken at 18 there is sufficient adhesive on the strip to allow the broken edge to adhere. A small area of adhesive overlaps onto the tab 16a. After treatment as by air-drying, heating, etc., stripes 16 become tough film strips. Usually, in the course of the same treatment, a constituent of each film strip 16 which is a tackifier for the adhesive precursor migrates into the adhesive precursor layer 14 and converts it into a highly tacky adhesive layer. Most of the area of tab 16a is free of adhesive. Little or no bond is developed between adhesive-free areas 16a of the film strips and the carrier sheet, due to the release property of the sheet in relation to the film. The tacky adhesive has a readily peelable bond to the release surface. The bond of the adhesive precursor to the release surface of the carrier is usually stronger. Areas 16a constitute handling tabs for the film strips. Identifying characters 20 are applied by silk-screen printing or equivalent. A clear protective film may cover each strip 16.

In use, tabs 16a are grasped and used to peel the adhesive-coated wire-marker strips from the carrier sheet. One or more turns of each strip is wound around the wire to be identified. Tab 16a is finally torn away.

The fact that the adhesive precursor is non-tacky where it has not absorbed the tackifying migratory constituent from the film strips is important for many reasons. First, sheets coated with the precursor layer and then dried can be safely stacked one on another directly without sticking together, obviously not possible with sheets coated with tacky adhesive. Next, completed sheets do not have exposed "overlap" areas of tacky adhesive and therefore finished sheets can be freely stacked without sticking together.

In FIG. 1, the area of the carrier occupied by the adhesive precursor 14 extends outside both sides or edges of the individual strips 16 of the coherent polymeric film. However, the adhesive precursor can be applied as stripes like strip 16 but slightly narrower. In that case, the film strips 16 would overlap onto the carrier at both lateral edges of each stripe of adhesive (adhesive precursor) just as is true of the tab 16a.

Figure 3:
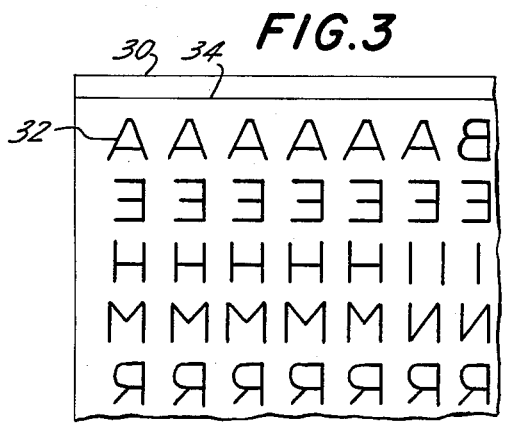
FIG. 3 is a fragmentary plan view of a novel dry-transfer sheet.
Figures 4, 5:
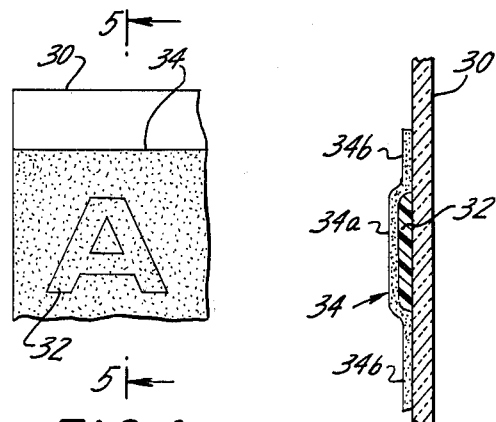
FIG. 4 is a fragmentary enlarged detail of FIG. 3.
FIG. 5 is an enlarged cross-section of FIG. 4 viewed at the plane 5—5 in FIG. 4.

Dry transfers represent a further and distinctive application of broad aspects of the invention. In FIGS. 3, 4 and 5, a dry transfer is illustrated including a carrier sheet 30 having release properties that enable only a limited bond to develop between the character films 32 and the carrier sheet. A pattern of layers 32 are silk-screened onto the carrier sheet and treated to convert them into tough films, as by heating, curing and/or drying or the like. An adhesive precursor layer 34 is then applied over the characters and overlapping on the carrier sheet around the outlines of the character films. This layer is represented as an all-over coating on sheet 30, although it could be applied as heretofore as a silk screen pattern covering only limited areas over and around the characters. The precursor layer becomes tacky in areas 34a overlying the character films 32 due to diffusion of the migratory tackifier constituent from the character films whereas the precursor film remains non-tacky in areas 34b outside the outlines of the character films. As represented in FIG. 5A, the adhesive precursor 34' can also be applied to the film areas 32' as a dusting powder before the film areas dry, while they are still tacky. The powdered precursor can be applied to the dried film if one is prepared to wait a few minutes for migration to occur. In the finished product the adhesive layer 34' is in registry with the outline of the coherent polymeric film 32'. There is no broad area of "overlap" adhesive. The adhesive layer extends microscopically to carrier 30' at points along the outline of film 32', adhering the film to the carrier even if the film-to-carrier bond should break. Powder on the carrier outside the areas of character films 32' remains powdery and can be removed readily by brushing or blowing. The materials used for dry transfers develop only slight tackiness to avoid adhesion for a receptor (receiving surface) unless greater than finger pressure is applied, e.g. 50 p.s.i.

In use, the adhesive side of the dry transfer faces the receptor. The carrier sheet is pellucid, either clear or at least sufficiently transparent to enable the user to recognize alignment of a selected character with a selected place on the receiving surface. The carrier sheet is stroked over the area of the selected character as with a ball-point pen to develop a secure bond between the adhesive layer 34a and the receiving surface. The weak bond of the selected character to the carrier sheet is broken, either by stretching the carrier sheet locally more than the character film or by developing a stronger adhesive bond of the selected adhesive-covered character to the receiving surface than the bond (after stroking) between the character and the carrier sheet. The character is thus transferred, but the non-tacky areas 34b remain bonded to the carrier sheet. There is no problem of transfer of adhesive (adhesive precursor) outside the margins of the characters.

It is necessary for layer 34 to shear along the character outline. This effect is realized of itself with some precursors, while with other precursors the shear property can be provided by adding a shear agent.

Film areas in the form of alphabetic characters are shown, but endless variation is possible. Plural film-forming layers may be deposited before the precursor layer is applied for making multicolor transfers. A clear film may be formed against the carrier sheet and one or more character films may then be applied so that the clear layer serves as a surface protector for the transfer. The films may be in the form of electrical circuit elements, symbols, and patterns of half-tone dots, shading, cross-hatching, and so forth.

Figure 6:
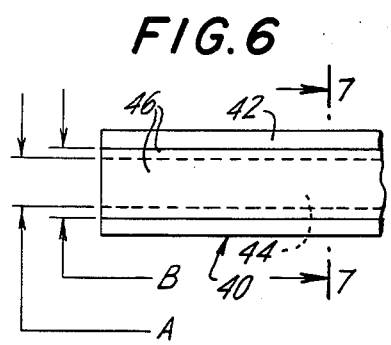
FIG. 6 is a fragmentary plan view of a novel doubly adhesive strip.
Figure 7:
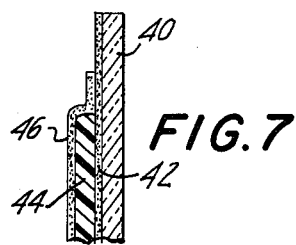
FIG. 7 is a fragmentary enlarged cross-section of FIG. 6 at the plane 7—7 in FIG. 6.

FIGS. 6 and 7 illustrate a still further application of the invention in broad aspect. Carrier strip 40 has release properties. A first adhesive precursor layer 42 is applied and solidified appropriately as by drying. Next a polymeric film-forming stripe 44 of width A is applied and solidified by a treatment appropriate to its composition. Layer 42 may be applied as by a roller-coating operation over all of the width of strip 40, or as a stripe somewhat wider than stripe 44. As in the case of the adhesive articles of FIGS. 1-5, stripe 44 may be plural layers of the same or differing properties and may include portions of contrasting colors for decorative purposes or for color-coding. This may be useful when the sheet applied over the doubly adhesive element is itself transparent or tinted or has transparent areas. Layer 44 may also be applied as plural separated parallel stripes and/or as discrete patches. Finally, a second adhesive precursor stripe 46 of greater width B than stripe A is applied. Stripe 46 can be the full width of the carrier sheet. Stripe 44 contains a tackifying migratory constituent that migrates or diffuses into layers 42 and 46 and renders layers 42 and 46 adhesive. The striped sheet with layers 42, 44 and 46 may be further subjected to suitable treatment to hasten migration of the adhesive-promoting constituent into layers 42 and 46. Storing the striped sheet at room temperature for various periods of minutes, hours or even days is usually the only treatment needed for migration of the tackifier to proceed to equilibrium.

The doubly adhesive article on sheet 40 is adhesive only in the area of stripe 44, plural stripes, patches, etc. Because part of sheet 40 extends outside the area of film layer 44, a readily recognizable edge of the film is accessible for engagement to start peeling the adhesive article from the sheet.

Figure 8:
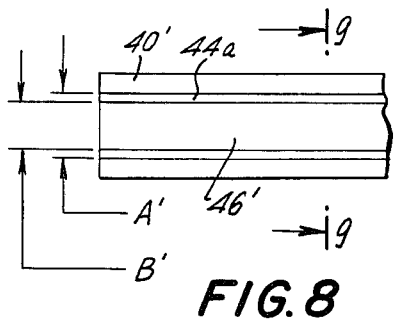
FIGS. 8 and 9 are corresponding views of a modification of the novel doubly adhesive strip shown in FIGS. 6 and 7.
Figure 9:
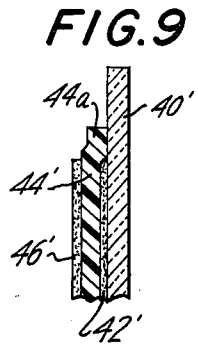

FIGS. 8 and 9 illustrate a variant of the doubly adhesive articles of FIGS. 6 and 7, primed numbers being used for corresponding elements. Distinctively, a marginal portion 44a of the polymeric film extends beyond the margin of layer 42'. Marginal portion 44a has little of any bond to sheet 40', to facilitate grasping a film margin when starting to peel the doubly adhesive coated material from the carrier sheet.

The adhesive articles on each carrier sheet as described above have a number of distinctive attributes. They are adhesive only in the areas common to the discrete coherent polymeric film layer(s) and the layer(s) of adhesive precursor. Where the adhesive precursor extends beyond the polymeric film areas onto the carrier sheet, it is fracturable along the outline(s) of the film area(s). Even if some of the precursor layer outside the film areas were to be released from the carrier sheet, that overlap precursor material is not tacky. It does not adhere to the receiving surface and is readily brushed away or otherwise removed.

DISTRIBUTION OF THE TACKIFIER IN THE FILM AND THE ADHESIVE PRECURSOR

The developed adhesive quality of the adhesive precursor depends heavily on the partition effect, which in turn depends prominently on solubilities of the selected migratory tackifying constituent in the selected materials of the polymeric film and of the precursor. The partition effect makes it possible to maintain a high degree of consistent repeatability of the tackiness in the resulting adhesive products.

Figure 10:
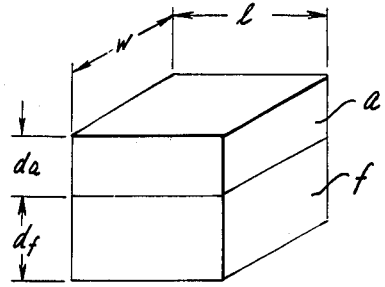
FIG. 10 is a diagram illustrating the well-known principle of "partition."

The partition or distribution effect or mechanism underlying the tack-controlling aspect of the invention may be understood by reference to FIG. 10 and the following explanation. According to the Nernst Distribution Law, "When a heterogeneous system has reached equilibrium there is a definite ratio between the concentrations of the same molecular species in the various phases, provided that the temperature is kept constant" where the molecular species is miscible with or soluble in the phases of the system. For wire labels and dry transfers, the "heterogeneous system" is the combination of the adhesive precursor layer and the layer, usually the coherent polymeric film layer, initially containing the migratory tackifier constituting the "same molecular species." Accordingly, in the usual case in which the migratory tackfier is initially present in the coherent polymeric film, the distribution law states that at equilibrium:

$$\frac{\text{Concentration of tackifier in adhesive layer}}{\text{Concentration of tackifier in polymeric film}} = K, \qquad \text{I.}$$

K being the constant ratio or "partition coefficient." It is slightly variable with temperature.

FIG. 10 shows a vertical section through such system having a length "l" width "w", adhesive layer depth or thickness "da", and polymeric film thickness "df", bearing in mind that the tackifier migrates essentially in a direction perpendicular to the planes of the two layers with no significant migration laterally in the adhesive layer. Referring to "i" as the initial amount of tackifier in the polymeric film layer "f", and "x" as the amount of tackifier which has migrated from the polymeric layer into the adhesive layer "a" at equilibrium, the amount of tackifier remaining in the polymeric film layer at equilibrium is "i-x".

Concentration being "mass per unit volume", at equilibrium the concentration of the tackifier in the adhesive layer shown in FIG. 10 is "x/dalw" and its concentration in the polymeric film layer is "i-x/dflw". Equation I then becomes $$K = \frac{x/dalw}{i - x/dflw} = \frac{x/da}{i - x/df} = \frac{xdf}{(i - x)da} \qquad \text{II.}$$

Solving for x:

$$x = iKda/(df + Kda) \qquad \text{III.}$$

Solving for i:

$$i = x\left(1 + \frac{df}{Kda}\right) \qquad \text{IV.}$$

The partition coefficient K has been found to be substantially constant, only slightly variable with temperature, and readily determinable for any particular system, i.e. combination of specific adhesive precursor and polymeric film formations, by analysis for concentration of tackifier in the adhesive layer at equilibrium.

The concentration of tackifier at equilibrium in the adhesive precursor layer is determinative of the tack or adhesiveness developed therein, and such concentration will in any particular system depend upon the relative thickness of the two layers and, of course, the value of K. Thus in a system with a K value of 4, an initial amount "i" of 5 parts in the polymeric film layer, and with each layer "da" and "df" made 10 micrometers thick, equation III above establishes "x" to be 4, and the concentration of tackifier in the adhesive layer at equilibrium is 4/10×l×w. However, when the thickness "da" of the adhesive layer is reduced to 5 micrometers and the thickness "df" of the polymeric film layer increased to 15 micrometers, "x" is determined to be roughly 3, and the concentration of tackifier in the adhesive layer at equilibrium is 3/5×l×w. With "l" and "w" cancelling out, the relative concentration is seen to increase to 3/5 or 60% from 4/10 or 40% with the assumed decrease in relative thickness of the adhesive layer.

Optimum relative thicknesses for any desired degree of tack in any particular system can thus be readily determined and controlled.

The value of K may be as low as about 0.5 and as high as 10 or more, the upper limit not being particularly critical because, as applied here, tackifier is to migrate from the film-forming layer to the adhesive precursor layer. Other factors being equal, a lower K value would generally call for a thinner adhesive precursor layer and conversely a higher K value would generally call for a thicker adhesive precursor layer. Too high a K value would generally indicate insufficient compatibility or solubility of the tackifier in the film-forming layer for the purposes of this invention.

Certain factors and considerations involved in the invention have been described hereinabove in such a manner as to enable the worker of ordinary skill in this art to practice aspects of the invention. The following descriptions and examples of specific embodiments are illustrative but in some instances they may comprise further aspects of the invention.

THE CARRIER

In general, the carrier is a flexible coherent sheet (including film, strip, etc.), having a release surface enabling the adherent article, whether a wire marker, a dry transfer, etc., to be readily and non-destructively peeled from the carrier sheet. Generally the peel bond between the carrier and the layer in contact therewith is lower than the bond between any of the superposed layers on the carrier and, in the case of dry transfers operating on the "tug-of-war" principle, lower than the bond between the adhesive layer and the receiving surface (receptor). The release property may be a natural characteristic of the carrier material or it may be imparted to the carrier by impregnating or coating the carrier with release material such as silicone or aluminum and chromium complexes of higher fatty acids, e.g. a stearate chromic chloride of du Pont & Co. For dry transfer products, the carrier sheet or layer is preferably sufficiently pellucid to facilitate positioning of the selected transfer on the selected location of the receptor.

The carrier sheet or the surface of the carrier sheet may consist of a polymer or copolymer, e.g. a polymer or copolymer selected from polystyrene and polystyrene homologues and substituted polymers including high impact polystyrene, polystyrene with rubbery additives such as butadiene as co-monomer, polystyrene butadiene acrylonitrile copolymer, acrylic polymers such as polymethylmethacrylate and other alkyl methacrylates, acrylic polymers with other polymers or co-monomers such as butadiene and acrylonitrile, vinyl polymers including vinyl chlorides, esters, acetals and alcohols and copolymers and with other polymers and co-monomers, cellulose esters and ether, polycarbonates, rubber hydrochloride, polyolefins such as polyethylene of normal and high density and polypropylene, polytetrafluoroethylene, polyesters, polyamides and gelatine. Other suitable carrier sheets are cellulose materials of all types, including those of natural origin such as paper or cardboard. Regenerated cellulose, metal foils of all types, paper laminates of metal foils, polymers and copolymers, and paper coated with such materials as silicones, or aluminum or chromium complexes, may all be used.

The carrier sheet may, of course, contain any of the conventional plasticizers, pigments, dyes, fillers, and/or stabilizers and the like as needed to assist in providing optimum characteristics, e.g. flexibility, tensile strength, release properties, and the like. Ideally, the carrier should be one that neither affects nor is affected by the layers thereon.

THE COHERENT POLYMERIC LAYER

In general, this layer has a basis of natural and/or synthetic homopolymers, copolymers and/or mixtures thereof adapted to form a coherent dry, non-tacky solid film which, in use, resists fracture when being transferred to the receptor. Examples of some suitable polymers are cellulose nitrate; cellulose acetate; cellulose acetobutyrate; ethyl cellulose; ethylhydroxyethyl cellulose; drying oils and drying oil varnishes; alkyds and alkyds modified or copolymerized with a drying oil, styrene, urethane, vinyl, silicone or acrylic resin; polyvinyl halides, esters, acetals and alcohols; polyurethanes; epoxy polymers; epoxyphenolic, polyamide, epoxypolyamide and catalyzed epoxy resins and copolymers; urea-, melamine-, and benzoguanamine-formaldehyde polymers; chlorinated and isomerized rubber; polystyrene and polyvinyl toluene; polysiloxanes and silicone containing polymers; polyacrylates, polymethacrylates and thermosetting acrylic resins; gelatin; zinc; casein, starch or modified starch. Polyvinylchloride is preferred.

The film may be composed of several similar or different layers and/or may carry the indicia as a discrete print or coating or the like. When applied as a fluid to the carrier or to the adhesive precursor layer or other layer, the applied layer may be converted to a tough film by air, ambient and/or heat drying of solvents, heat curing, ultraviolet or infra red radiation, or the like. If the film is preformed, it may be laminated to the carrier sheet, or to the adhesive precursor layer or other layer in the adhesive product being prepared, as the case may be.

Preferably, the above polymers are applied to the carrier sheet, adhesive precursor layer, or other layer in the form of viscous liquid, such as an ink or lacquer, i.e. a solution in organic solvents, or an aqueous emulsion, hot melt, plastisol, organosol or as a liquid monomer containing catalyst followed by polymerization in situ. Various coating processes which may be used are roller, knife, metering bar, wire rod, spray or extrusion, or a printing process, such as silk screen, flexographic or gravure printing. Silk screening is generally preferred. The layer is then dried or set. If the lacquer contains a solvent this should not sufficiently dissolve or attack the carrier film, adhesive precursor or other layer under the particular drying conditions and coating thickness, to damage it mechanically or to prevent the desired elongation values or to increase the adhesion of the transferable film to carrier sheet past the acceptable limits.

The transferable coherent polymeric layer or film is formulated to provide the necessary physical specifications of tensile strength, elongation and, when applied directly to the carrier sheet, limited adhesion thereto. For any given thickness and other dimensions of the coherent polymer film, its tensile strength is mainly determined by the polymer used and to a lesser extent by the plasticizer concentration; its elongation is also determined mainly by the polymer and the amount of plasticizer; the bond between carrier sheet and transferable layer is determined by the compositions used and also by the plasticizer concentration of the film, a high plasticizer concentration giving greater bond strength or more mutual adhesion than a low plasticizer concentration. The same chemical class of polymer is preferably not used for the carrier sheet and the layer engaging it since strong specific adhesion forces are usually produced. Solvents used in applying the carrier-engaging layer may increase adhesion to the carrier sheet if they etch or soften it. Solvents are avoided which mechanically damage the carrier sheet. Similar considerations apply when this transferable polymeric film layer is applied to the adhesive precursor layer.

Pigments, dyes, fillers and stabilizers may be incorporated in the transferable layer. These have a moderate effect on tensile strength, elongation and adhesion which must be allowed for. The tensile strength of the transferable layer is dependent on its thickness and this is also controlled.

The transferable film should be sufficiently coherent to avoid fracture when being transferred to the receptor. After application to the surface of a receiving object, the film ordinarily should have adequate adhesion to withstand handling and use. However, the adhesion may be limited to enable the film to be partly or entirely removed from the receiving surface without damage. Tackiness of the adhesive of the transferable film may be limited so that the film can be peeled from even delicate surfaces such as paper, as by scoring and lifting up an edge of the transferable film with a needle or knife and peeling it away. For this purpose, the attributes of the film should result in a tensile strength at break point higher than the peel bond of the adhesive to the receiving surface. However, the transferable film may be formulated from ingredients which can be softened by solvents and in that case it may readily be provided that the transferable film, after application to the receiving surface, may be softened by a fixing solvent or varnish and, after evaporation of the solvent, the transfer will be adhered to the receiving surface so that it is no longer readily removable.

The transferable film may also be formulated with materials which are not softened and increased in adhesion by selected paints and inks so that these paints and inks may be applied over the transfer which is removed, operating as a mask or stencil. After drying, the transfer may be removed as described above, leaving an image in paint or ink on the receiving surface.

According to an essential feature of this invention, one of the layers in the instant adhesive product, preferably the coherent polymeric film layer, contains a migratory tackifier, more fully described below, for the adhesive precursor layer in an amount sufficient to render the latter layer suitably tacky or pressure sensitive in situ after formation of such layers and migration of the tackifier into the adhesive precursor layer as governed by the above-described partition coefficient applicable to the particular multi-layer system being employed. The tackifier must be compatible in and with the formulations of both the coherent polymeric (or other) layer and the adhesive precursor layer, and is preferably initially present in the coherent polymeric (or other) layer in such amount that after migration therefrom of the amount of tackifier effective at equilibrium to render the adhesive precursor tacky in situ, the amount remaining in the coherent polymeric (or other) layer results in the latter layer having the desired degree of softness or hardness best suited for the ultimate use of the adhesive product, in addition to the necessary degree of adhesion to the adjacent layer, i.e. limited releasable adhesion to the carrier sheet, high non-releasable adhesion to the activated adhesive layer, etc. The coherent polymeric layer may initially contain about 5% to about 500% of the migratory tackifier by weight of the polymers in the layer, the specific amount depending on the polymer or polymers present. The applied layer usually has an ultimate thickness (after drying) of about 0.3 to about 15 mils.

THE ADHESIVE PRECURSOR LAYER

In general, this layer also has a basis of natural and/or synthetic homopolymers, copolymers and/or mixtures thereof which, however, may or may not be adapted to form a coherent dry solid film. According to the invention, this layer is initially non-tacky, as by suitable control of the type and/or concentration of its polymeric content, being rendered tacky or pressure sensitive in situ only after migration thereinto of the required amount of migratory tackifier from the coherent polymeric (or other) layer. This layer does not interact with either the carrier or polymeric film. Bearing in mind that the formulation of this adhesive precursor layer, apart from migratory tackifier, should not correspond to that of the coherent polymeric layer, the adhesive precursor layer may contain as polymers and resins natural unvulcanized rubber, vulcanized rubber, synthetic rubber such as polyisobutylene, polychloroprene, polybutadiene, polyacrylonitrile and copolymers of these and with styrene and styrene homologues and acrylic monomers; polyvinyl alkyl ethers such as methyl, ethyl and butyl ethers; acrylic and methacrylic polymers and copolymers, especially the homopolymers and copolymers of the lower (e.g. $C_1$–$C_4$) alkyl acrylates and methacrylates, rosin and rosin derivatives such as hydrogenated rosin, esters and alcohols; liquid polymeric styrenes and styrene homologues; polymerized terpenes such as $\beta$-pinene; ketone resins such as cyclohexanone condensation resin; low molecular weight polyisobutylenes and other olefins; ester gum; and others disclosed below.

The type of adhesive formed in situ herein will, of course, depend in part on the particular polymeric types contained in the adhesive precursor layer. The following Table I contains a list of some polymers suitable for activation to tacky condition by migration thereinto of the migratory tackifier, e.g. DEHP (di-2-ethylhexylphthalate), and the type of adhesive developed.

It will be understood that the tack developed will in part depend on the particular polymeric content of the adhesive precursor layer and the particular migratory tackifier involved, and that there is a considerable variation in the amount of any particular tackifier needed to produce a similar degree of tack with different polymers or resins as shown in the following Table II listing the amounts of DEHP migratory tackifier needed to develop a roughly equivalent relatively low degree of tack in 100 parts of the listed resin. Typically, after application and drying or hardening of the precursor and coherent polymeric film layers, and prior to tackifier migration, the precursor layer generally consists of at least 50%, preferably at least 75%, up to 100% of the described polymeric material, whereas the coherent polymeric layer generally contains, apart from minor amounts of conventional components, polymeric material and migratory tackifier in a weight ratio of about 20:1 to 1:5, preferably about 20:1 to 1:1.5, more preferably about 5:1 to 1:1.

TABLE I

| Adhesive Precursor Polymer | Type of Adhesive Formed with Migratory Tackifier |
| --- | --- |
| Poly(n-butyl methacrylate) low mol. wt. | High tack, stable |
| Poly(n-butyl methacrylate) high mol. wt. | Low tack, stable |
| Methacrylate copolymer resins | Range from very low to high tack level |
| Polyamide | Soft, high tack |
| Chlorinated rubber | Low to high tack |
| Nylon 12 | Soft, high tack |
| Poly(styrene-butadiene) | Low tack, hard |
| Vinyl chloride/acetate copolymer | Low tack with high acetate content |
| | High tack with low acetate content |
| Hydrocarbon resins | High tack level |
| Ketone resin | High tack level |
| Hydrogenated rosin | High tack level |
| Glycerol esters of rosin | High tack level |
| Glycerol esters of hydrogenated rosin | High tack level |
| Coumarone indene resin | High tack level |
| Pentaerythritol ester of rosin | High tack level |
| Non-oxidizing alkyd resin | Generally low tack |
| Poly(vinyl chloride) | Low to medium tack depending on the molecular weight |
| Cellulose nitrate | Low to medium tack |

TABLE II

| Resin, 100 Parts | DEHP Tackifier |
| --- | --- |
| ½ second nitrocellulose | 150 parts |
| Cyclohexanone condensation resin (Ketone Resin N-BASF) | 27 parts |
| Poly(n-butyl methacrylate) | 41 parts |
| Ester gum | 20 parts |

The non-tacky adhesive precursor layer is applied to the coherent polymeric layer, carrier sheet or other layer in substantially the same condition and by substantially the same means and procedures as disclosed above with respect to the application of the coherent polymeric film layer.

As described above in connection with FIG. 5A, the adhesive precursor may also be applied by dusting as a powder on the polymeric film. The powder is activated to tacky condition only in the areas of the polymeric film. Any powder dusted on the areas of the carrier surrounding the polymeric film remains in non-tacky powder form and is readily removed by brushing, blowing or the like. As a result, the adhesive layer is automatically in register with the polymeric film and does not extend onto the carrier except as a microscopically narrow outline of the film.

This adhesive precursor layer may also contain conventional auxiliary agents, stabilizers and/or detackifiers or the like, and may, in fact, be substantially similar to the known adhesive layers employed in dry transfer products except for the absence therefrom of tackifier in the amount needed to develop the described degree of tack whether it be an aggressive instantaneous tack or a lower pressure sensitive tack, e.g. sensitive to or activatable at pressures of at least about 50 p.s.i. which is suitable for dry transfers.

In those instances involving an initial adhesive precursor formulation which would yield a tacky layer, a detackifier may be added in an amount sufficient to eliminate the tackiness and still render the precursor layer activatable to tacky condition in situ by the migratory tackifier.

As suitable detackifying components there may be mentioned wax or wax like material having a Durometer hardness of less than 100 Durometer units (ASTMD 676-49T, Shore A2 instrument). Generally suitable materials are long chain hydrocarbons containing 12 or more carbon atoms such as paraffin and micro-crystalline wax, polyethylene waxes, i.e. low molecular weight polyethylene, Fischer Tropsch waxes, and saturated and unsaturated long chain hydrocarbon derivatives such as carboxylic acids (fatty acids) and their metal salts, esters, alcohols; amides; nitriles, amines, amine salts, quaternary ammonium derivatives, fatty acid mono- or polyesters of polyols and polyethylene glycols; fatty alcohol ethers of polyethylene glycols; polyethylene glycols, polypropylene glycols, and the like.

These detackifying components may also serve as shear agents in the activated adhesive layer, useful in certain transfer products of the invention. Other shear agents such as silica powder and other similar powdered solids, brittle non-film-forming resins, and immiscible resins and the like may also be included which may exert a detackifying function.

THE MIGRATORY TACKIFIER

The migratory tackifier initially included in the polymeric film (or other) layer should be compatible therein i.e., readily miscible with or in a sense soluble both in the polymeric film and in the adhesive precursor layer and should be capable of migration under ambient conditions or if desired under elevated temperature conditions. This usually calls for a material which is sufficiently fluid or liquid under such conditions, i.e. fluids or relatively low melting solids. Preferably the tackifier is relatively non-volatile but in some instances a relatively volatile tackifier, or a polymerizable tackifier, may be employed whereby, after the adhesive product is applied to the receptor, the adhesive bond therewith is rendered permanent by polymerization or heat-induced volatilization (e.g. bake-on transfer) of the tackifier.

Typically, the tackifier may be selected from among the many known plasticizers for the polymeric content of the polymeric film (or other) layer and of the adhesive precursor layer, such plasticizers being usually a liquid, or in some instances a low melting solid, such as esters of carboxylic acids or of phosphoric acid. Less usually, known hydrocarbon, halogenated hydrocarbon, ether, polyglycol and sulfonamide plasticizers may be employed. Although polymeric plasticizers may in some instances act as migratory tackifiers, monomeric plasticizers are preferred. Generally, the plasticizer should have a molecular weight (M.W.) of at least about 250 up to about 500. In some special instances, plasticizers of higher molecular weight are useful.

Readily available plasticizers operative as migratory tackifiers herein, and their properties and compatibilities with various polymeric materials, are disclosed, for example, in the following publications, which disclosures are incorporated herein by reference thereto:

Kirk-Othmer, *Encyclopedia of Chemical Technology*, 2nd Ed. (1968), Vol. 15; Table 2 on pages 738, 739; Table 5 on page 755; Table 13 on pages 778–781; and Table 14 on pages 782, 783.

*Modern Plastics Encyclopedia*, October 1975, Vol. 52, No. 10A. Plasticizers Chart on pages 692–702.

Preferred plasticizers useful as tackifiers herein are the alkyl, aryl and cycloalkyl esters of phthalic, adipic, succinic, maleic, sebacic, suberic, glycolic, recinoleic, phosphoric, and amino sulfonic acids, especially di(2-ethylhexyl)-phthalate and di(2-ethylhexyl)sebacate.

The following examples are illustrative of certain preferred embodiments of this invention. Some of the examples may represent embodiments of further aspects of the invention. All amounts and proportions referred to herein and in the appended claims are by weight unless otherwise indicated. (T) identifies the tackifier.

EXAMPLE 1 (Film over Adhesive)

|  | Parts |
|---|---|
| Coherent Polymeric Film Forming Layer | |
| PVC* dispersion resin | 50.4 |
| Ba/Cd stabilizer | 1.6 |
| Epoxidized soybean oil | 3.9 |
| Di-octyl phthalate (T) | 27.1 |
| Titanium dioxide | 12.4 |
| Barium sulfate | 3.9 |
| Silicone oil solution | 0.7 |
| Adhesive Precursor Layer | |
| Poly(n-butyl methacrylate) | 33.3 |
| poly(ethyl acrylate) | 1.7 |
| silicone oil | 0.2 |
| ethylene glycol monoethyl ether acetate | 64.8 |

*Polyvinylchloride, 100%, non-volatile.

The precursor is applied onto silicone resin coated poly(ethylene terephthalate) film as an 0.5 mil thick film when dry. This is dried by evaporation to give a clear smooth film.

The film-forming layer is cast as a 2 mil thick wet film onto the precursor layer and fused at 165° C. for 5 minutes.

For testing the resulting tack, a ¼" wide strip of the resulting composite is applied to glass and peeled away at 90°, requiring ½ oz. force to maintain a slow peel rate.

Addition of 10% rosin ester to the precursor layer formulation increases the peel resistance to 1½ oz.

EXAMPLE 2

Example 1 is repeated, with similar results, using a precursor layer formulation containing 80 parts of the same 33.3:1.7 mixture of methacrylate and acrylate and 20 parts of Aerosil 300 (an aerogel silica shear agent made by Degussa).

Example 3 (Film over the Adhesive)

|  |  | Parts |
|---|---|---|
| Carrier sheet: | Aluminum foil | |
| Adhesive precursor layer: | Pinene polymer resin | 20 |
|  | High molecular weight poly(ethyl vinyl ether) | 10 |
|  | Mineral spirits | 70 |

Coat solution onto the foil to give an 0.3 mil thick dry layer which is essentially non-tacky.

| | |
|---|---|
| Coherent polymeric film forming layer: | |
| Poly(vinyl chloride) dispersion | |
| resin | 51 |
| Butyl benzyl phthalate (T) | 10 |
| Di-2-ethyl hexyl phthalate (T) | 30 |
| Stabilizer | 2 |
| Epoxidized soybean oil | 5 |
| Titanium dioxide pigment | 22 |

Coat onto the precursor layer to give a 3.0 mil thick layer. Heat for 1 minute at 180° C. (355° F.) to cure to a flexible film. (Thickness is virtually the same whether wet or dry.)

The same film-forming layer may be screen-printed onto the precursor layer in discrete areas. After curing, these areas may be peeled off the carrier sheet and the precursor material tends to shear cleanly at the edges of the film former when the product is applied to a receptor.

Similar results are obtained using vinyl resin casting paper or silicone release-coated Mylar film as the carrier sheet.

Example 4 (Clear Coherent Film over the Adhesive)

Carrier sheet: Silicone release coated Mylar film.

| | Parts |
|---|---|
| Adhesive precursor layer: | |
| Low molecular weight n-butyl methacrylate polymer | 20 |
| Low molecular weight ethyl methacrylate polymer | 15 |
| Cellulose nitrate, high nitrogen content, low viscosity | 3 |
| Cellosolve solvent | 61.8 |
| Silicone oil | 0.2 |

Coat onto the carrier sheet and dry to non-tacky layer.

| | Parts |
|---|---|
| Coherent polymeric film forming layer: | |
| PVC dispersion resin | 100 |
| Di-octyl phthalate (T) | 67 |
| Dibasic lead stearate | ½ |
| Filler | 30 |

Coat on the precursor layer. Precure at 120° C. for 2 minutes. Cut into tapes and fuse for 30 sec. at 180° C.

This tape construction is stable for 24 hours at 180° C. although it shows significant yellowing at this temperature.

Example 5 "Bake-on" Dry Transfer (Adhesive over the Films)

Carrier Sheet: Aluminum foil
Coherent polymeric film forming layer: As in Example 1.
Print as large lettering, 2–5 mils thick by screen printing; cure at 120° C. for 1 minute.

| | Parts |
|---|---|
| Adhesive precursor layer: | |
| 50% w/w Ester gum in cellosolve acetate | 15 |
| 30% w/w Cellulose nitrate in cellosolve acetate | 5 |
| Aluminum powder | 0–5 |
| Micronized silica aerogel | 0–5 |

Screen print precursor layer in close register with the film forming layer at 0.3 mils dry thickness and air dry. Desirably, protect adhesive surface with a temporary release-coated sheet.

As made, this gives a vinyl decal with a high tack adhesive. Letters may be peeled off the aluminum film and adhered to the receiving surface. Heating the adhered product for one hour at 120° C. deactivates the adhesive layer. It becomes dry and non-tacky, forming an excellent bond to such surfaces as metal and paint with excellent scratch resistance.

Example 6 Dry Transfer (Adhesive over the Film)

Carrier sheet: High density polyethylene film, gauge 3 mil.

| | Parts |
|---|---|
| Coherent polymeric film forming layer (design layer): | |
| Nitrocellulose, high nitrogen content, ¼ second viscosity 23¼ non volatile in ethylene glycol monobutyl ether | 100 |
| Plasticizer (di-2-ethyl hexyl phthalate) (T) | 25 |
| Carbon black pigment | 6 |

This is applied onto the carrier sheet by screen printing in a design. A dry layer of 0.2 to 0.5 mil thickness is left after drying in air at 68° F. (20° C.).

| | |
|---|---|
| Adhesive precursor layer: | |
| Ester gum | 50 |
| Ethylene glycol monoethyl ether acetate | 30 |
| Mineral spirits | 20 |

This is roller coated over the design to give a 0.1 to 0.3 mil dry film. It is dried at 70° C. for 2 minutes in order to eliminate the solvent.

The adhesive product is low tack, sufficient to adhere the design in the film forming layer to paper. Around the design layer the precursor layer remains non-adhesive and does not transfer from the polyethylene. The precursor layer shears easily around the design without the need for a shear agent.

Similar results are obtained using biaxially oriented high impact polystyrene film, gauge 3 mil, as the carrier sheet.

Example 7-Dry Transfer (Adhesive over the Film; Dusting Process)

Carrier sheet: Silicone coated mylar sheet, gauge 2 mil.

| | Parts |
|---|---|
| Coherent polymeric film forming layer: | |
| Poly(vinyl chloride) dispersion resin | 50.0 |
| Cd/Ba stabilizer | 1.5 |
| Epoxidized soybean oil | 4.0 |
| Di-n-butyl phthalate (T) | 28.0 |
| Pigment | 16.5 |

This ink printed as lettering onto the carrier sheet and gelled at 120° C. for 30 seconds.

Adhesive precursor layer:

A thin, even layer of cyclohexanone condensation resin product in powder form is dusted over the area of the lettering, extending onto the unprinted sheet. After heating at 80° C. for 5 minutes (well below the melting point of the resin), migration converts the dusted powder over the lettering into a tacky adhesive. Excess powder is brushed off the sheet leaving adhesive in perfect register with the design lettering, with microscopic overlap.

Example 8-Adhesive Strips

Carrier sheet: Quilon* coated casting paper.
Adhesive precursor layer:
Stripes of a solution of a methyl methacrylate/butyl methacrylate copolymer resin** in ethylene glycol monoethyl ether are coated onto the carrier sheet and allowed to dry. The dry film is 0.3 mil thick.
*DuPont-Werner complex release agent.
**DuPont-Elvacite 2044, 30% solution.
Coherent polymeric film forming layer:
Stripes of the vinyl plastisol formulation of Example 4 above are coated over and in close register with the precursor stripes but extending on past the end of the stripes and onto the support film. Dry film thickness is 3 mil. The whole is gelled and fused at 165° C. for 2 minutes.

It is found that the area of the fused plastisol layer on the casting paper is much more easily released from the casting paper than the area of the plastisol with adhesive under. When the strip is in the form of a tape this is a convenient method of using the tape since one could easily handle the non-tacky portion of the tape.

Example 9 (Film over the Adhesive)

Carrier sheet: A 6 mil gauge vinyl casting sheet with a release coating on Quilon.
Adhesive precursor layer:
A 70% N.V. solution of ester gum in ethylene glycol acetate, coated onto the carrier sheet and dried, dry thickness 0.4 mil.

|  | Parts |
| --- | --- |
| Coherent polymeric film former: |  |
| Polyvinyl chloride resin | 100 |
| Polymeric plasticizer (Paraplex G54) (non-migratory) | 70 |
| Plasticizer (Paraplex G60) (T) (epoxidized soybean oil) | 5 |
| Stabilizer | 2 |
| Carbon black | 2 |

Coated as a 3 mil film over the dry adhesive precursor layer and fused at 170° C. for 1 minute. The G60 tackifies the ester gum. This yields a flexible vinyl film with an aggressively tacky adhesive layer on the carrier sheet.

Example 10-Clear Tape-(Low-Tack Adhesive over Film)

Carrier sheet: 2 mil clear untreated polypropylene film.

|  | Parts |
| --- | --- |
| Coherent polymeric film forming layer: |  |
| Cellulose acetate butyrate resin, 20% non-volatile in diacetone alcohol | 100 |
| Butyl benzyl phthalate (T) | 21 |

A film is cast onto the carrier sheet to give a clear coating of 1.5 mil dry thickness.

|  | Parts |
| --- | --- |
| Adhesive precursor layer: |  |
| Ester gum | 50 |
| Ethylene glycol acetate | 30 |
| Mineral spirit | 20 |

This precursor layer is applied over the film forming layer and dried to an 0.2 mil dry thickness. A clear tape is cut from this construction which could be peeled from the carrier sheet and has a low tack adhesive surface.

Example 11 Double Sided Adhesive

Carrier Sheet: Silicone coated vegetable parchment paper.
Adhesive precursor layer A:
A methyl methacrylate/butyl methacrylate copolymer formulation as in Example 8 is cast onto the paper with a dry film thickness of 0.4 mil.
Coherent polymeric film forming layer:
A vinyl plastisol formulation as in Example 4 is cast onto the dry precursor layer and gelled at 120° C. for ½ minute. Dry film is of 1.5 to 2.0 mil thickness.
Adhesive precursor layer B:
A second layer of the same formulation and thickness as precursor layer A is cast over the vinyl plastisol layer and allowed to dry as before.

The construction is then heated at 180° C. for 45 seconds to fuse the plastisol film and complete the production. When slit into ⅜" wide tapes this construction is used as a double sided adhesive tape. The adhesive has a moderate tack level.

Example 12-Dry Transfer (Vinyl Film, for Vinyl Receptor)

Carrier sheet: High density polyethylene film, 4.5 mil gauge, with an untreated surface.

|  | Parts |
| --- | --- |
| Coherent polymeric film forming layer: |  |
| Polyvinylchloride/acetate copolymer resin (85/15 ratio) | 22.2 |
| Ethylene glycol acetate | 55.5 |
| Cyclohexanone | 22.2 |
| Kodaflex Tx1B (2, 2, 4-trimethyl-1,3-pentanediol di-isobutyrate, M.W. 286.4, Eastman Kodak) (T) | 25.0 |
| Copper phthalocyanine blue pigment | 4.6 |

This formulation is screen printed onto the carrier sheet in the form of blue lettering and allowed to dry.

|  | Parts |
| --- | --- |
| Adhesive precursor layer: |  |
| Cyclohexanone condensation product resin | 30.0 |
| Aerogel silica | 2.0 |
| Ethylene glycol acetate | 40.0 |
| Mineral spirit | 28.0 |

This formulation is coated over the blue lettering in the form of a thin continuous film and dried at 80° C. for 2 minutes using a warm air blower to remove solvent vapors.

The lettering dry transfer product could be applied to a variety of receiving surfaces using localized pressure. Good shear of the precursor at the lettering edges is observed. Bonds to vinyl receptor without the vinyl film becoming tacky.

Example 13 (Film over Adhesive)

System A-K Equals 4

Carrier sheet: 6 mil gauge casting paper with Quilon coating.

|  | Parts |
|---|---|
| Coherent polymeric film former: | |
| Poly(vinyl chloride) homopolymer dispersion resin | 50 |
| Stabilizer | 5 |
| Di-2-ethyl hexyl phthalate (plasticizer) (T) | 28 |
| Pigment | 17 |

This film-forming formulation is coated as a 2.3 mil gauge film over a dry layer of 0.5 mil gauge coated on the carrier sheet with the following adhesive precursor formulation.

|  | Parts |
|---|---|
| Adhesive precursor layer: | |
| Poly(n-butyl methacrylate) | 25 |
| Ethylene glycol acetate | 75 |

Equilibrium is achieved within 1 hour after fusion of the film former at 165° C. for 1 minute.

The partition coefficient K is determined for this system as 2.5 at 25° C.

System B-K equals 1.0

When the above procedure is repeated but substituting the methacrylate precursor layer by a cyclohexanone condensation resin layer, the partition coefficient K is determined to be 1.0 at 25° C.

In System A, there is a transfer of plasticizer to the precursor methacrylate resin layer of about 60 per 100 parts resin producing a low tack pressure sensitive adhesive system. The vinyl film ends up with about 65% of its original plasticizer concentration. For the cyclohexanone resin system B plasticizer is taken up only to a maximum of about 30 parts per 100 parts resin. However, it is found that resins of this type (brittle, hard) only need this much plasticizer to give aggressive, high-tack adhesives.

In System A the loss of plasticizer by the vinyl system might be considered a disadvantage. However, we can turn this to advantage as follows.

In order to print or coat a vinyl plastisol, the viscosity must be low enough to allow flow to occur. Viscosity is dependent on several factors; one of the most important is the viscosity and amount of plasticizer present. High plasticizer content gives low viscosity but at the same time the final film is very soft. In this case we can add additional plasticizer and achieve good processing but in the final film with reduced plasticizer level we can have harder, less extensible film. For wire markers this is a desirable feature.

A typical figure for adhesion to glass is determined by a test in which a sample of the test product 25 mm, wide (1") is laminated to clean glass. The sample is peeled from the glass (at 90° to the glass surface) at a rate of 25 mm, per minute. In System A with methacrylate resin adhesive, a "peel resistance" figure of 40 to 60 grams is obtained. This remains constant over a period of 1 week under ambient conditions.

Example 14 Colored Film Product

Carrier Sheet: A 2 mil gauge polyethylene terephthalate film (Mylar) with a coating of solvent silicone release agent.

|  | Parts |
|---|---|
| Adhesive precursor layer: | |
| Butyl methacrylate/ethyl methacrylate copolymer resin (ca 20/1) | 12.0 |
| Silicone oil (Dow Chemical DC7) | 0.1 |
| Methyl ethyl ketone | 87.9 |

This formulation is coated onto the carrier sheet and dried using a forced air blower to remove the solvent. The wet film coating is deposited at a weight of 25 grams per square meter. This yields a non-tacky, non-adhesive layer.

|  | Parts |
|---|---|
| Coherent polymeric film former layer: | |
| Cellulose acetate butyrate (Eastman CAB 381.01) | 20.0 |
| Polyester plasticizer (Paraplex G54, M.W. 3300, Rohm & Haas) | 5.0 |
| Di-2-ethyl hexyl adipate (T) | 4.5 |
| Iso-butyl acetate | 40.0 |
| Ethyl glycol acetate | 20.0 |
| Mineral spirits | 10.5 |

This formulation is bar coated onto the precursor layer and dried using a hot air blower at 80–100° C. in order to remove the solvents and give a dry film with minimmum solvent interaction with the precursor layer. The dry film thickness of the two coated layers is determined as 2.4 mils (58 micron). After 24 hours areas of the adhesive product can be cut from the carrier sheet using a sharp knife. The carrier sheet resists cutting but the adhesive product cuts easily. The cut portions can be peeled from the carrier sheet and adhered to a receiving surface. The adhesive has a very low tack level since only the di-2-ethyl hexyl adipate migrates (the polyester plasticizer shows no tendency to migrate in a control experiment where the adipate plasticizer is replaced by the polyester plasticizer). The adhesive shows sufficient adhesive properties to adhere to glass and other smooth, non-porous surfaces.

Stability of the product is good. It shows no tendency to turn yellow or deteriorate on exposure to ultra-violet light.

Using suitable dyes at concentrations of 2.0 to 7.0% in either or both of the layers, a range of colored adhesive products is produced. Examples of suitable dyes are

| Blue | Orasol Blue GN (Ciba-Geigy Corporation) |
| Yellow | Orasol Yellow 3R |
| Violet | Orasol 3BN |
| Brown | Orasol Brown GR |

The products are useful graphic arts color tint overlay materials.

A red film made using 5% concentration of Neozapon Fiery Red B1 (BASF Corporation) is also useful as a stripping film for use in photographic reproduction since it is "red light safe" to orthochromatic film materials.

Example 15-Wire Marker (See FIGS. 1 and 2)

Carrier sheet: A casting paper coated witth A "solvent" silicone release agent giving a "high" (i.e. easy) release surface with no loss of silicone release agent into the adhesive. Gauge 6.5 mil (162 microns.)

Adhesive precursor layer:

As in example 11 above, with the addition of 0.1% silicone oil to prevent repulsion of the wet printed (screen printed) adhesive precursor from the silicone release surface of the casting paper. Screen printed on the carrier sheet in strips and dried at 70° C. for 1 minute to a dry film thickness of 0.3 mil (7.5 micron). The strips are carried slightly past the point at which the tab on the film former will break so as to leave the adhesive on the wire marker, with no possibility of the broken end of the wire marker being without adhesive.

Coherent polymeric film forming layer:

As in example 7 above, screen printed in stripes in close register with the adhesive precursor strips but with tabs and perforations as shown in FIGS. 1 and 2, then gelled at 120° C. for 40 seconds to give a dry film of gauge 3.0 mils (75 microns). Identification Numbers:

Screen printed onto the vinyl film forming layer using a commercially available black ink. The ink used is a Black Gloss Vinyl ink reference 8016, made by the Tibbets-Westerfields Paint Co., Inc.

In use the tab has minimal adhesion to the casting paper and may be removed very easily (far more so than the vinyl film strips with adhesive under). Holding the tab, the user peels the wire marker strip off the casting paper. After application of the adhesive end of the strip to the wire by a wrapping process, the final act is to break off the tab at the perforation. The same process ensures that the end of the strip is securely adhered down since the tension involved in breaking applies pressure the the end of the strip.

Final Processing

Once the product has been printed complete with the numbering the vinyl film is fully cured (or fused) by heating at 180° C. for 30 seconds. This increases the strength of the vinyl film to a maximum.

This invention has been described with respect to certain preferred embodiments thereof and it will be understood that modifications and variations thereof obvious to those skilled in the art are to be included within the spirit and purview of this application and the scope of the appended claims.

What is claimed is:

1. A method of producing an adhesive product including the steps of providing plural layers on a release surface of a carrier sheet, one of said layers being initially a non-tacky precursor of a pressure-sensitive adhesive, and another of said layers being in contact with the adhesive precursor layer in a common area extending over only part of said release surface and forming a non-tacky coherent polymeric film containing a migratory tackifier for the adhesive precursor layer, said tackifier being initially present in an amount sufficient to convert the adhesive precursor layer into a tacky pressure-sensitive adhesive layer in situ by migration to equilibrium of such amount of the tackifier into so much of the adhesive precursor layer as occupies said common area, the release surface of the carrier sheet being of the kind which, when a pressure-sensitive adhesive layer is formed thereon, forms a bond thereto that is readily peelable without the assistance of solvents or heat, and which, when a coherent polymeric film is formed thereon, forms only a weak bond thereto that is readily releasable without the assistance of heat or solvents.

2. The method of claim 1 followed by subjecting said layers to conditions promoting said migration.

3. The method of claim 1 wherein said adhesive precursor layer has a basis of a film-forming resin and said tackifier is a plasticizer for said polymeric film and said adhesive precursor layer.

4. The method of claim 3 wherein said plasticizer is a polyester.

5. The method of claim 3 wherein said plasticizer is monomeric and normally a liquid having a molecular weight of at least about 250 to about 500.

6. The method of claim 5 wherein the plasticizer is an ester of a carboxylic or phosphoric acid.

7. The method of claim 6 wherein the plasticizer is a dialkyl phthalate.

8. The method of claim 1 wherein said coherent polymeric film has a basis of a vinyl polymer or a cellulose derivative.

9. The method of claim 1 wherein said coherent polymeric film has a basis of polyvinyl chloride.

10. The method of claim 1 wherein said coherent polymeric film has a basis of a cellulose ester.

11. The method of claim 1 wherein said coherent polymeric film has a basis of nitrocellulose.

12. The method of claim 1 wherein said coherent polymeric film has a basis of cellulose acetobutyrate.

13. The method of claim 1 wherein said adhesive precursor layer has a basis of a lower alkyl acrylate or methacrylate or copolymer thereof, ester gum or cyclohexanone condensation resin.

14. The method of claim 1 wherein said adhesive precursor layer has a basis of a copolymer of two different lower alkyl methacrylates.

15. The method of claim 1 wherein said adhesive precursor layer has a basis of ester gum.

16. The method of claim 1 wherein said adhesive precursor layer has a basis of cyclohexanone condensation resin.

17. The method of claim 1 wherein said coherent polymeric film and said adhesive precursor layer occupy different areas of said release surface, each of said different areas including said common area, the adhesive precursor layer thereby becoming tacky only in said common area.

18. The method of claim 17 wherein said coherent polymeric film is formed on said adhesive precursor layer.

19. The method as in claim 18 wherein a plurality of said carrier sheets each bearing an adhesive precursor layer as aforesaid are stacked before said coherent polymeric film is provided on each of the adhesive precursor layers.

20. The method as in claim 18 wherein the coherent polymeric film-forming layer as applied is essentially free of volatile solvents and wherein said applied polymeric film-forming layer is subjected to solidifying conditions.

21. The method of claim 18 wherein the coherent polymeric film-forming layer initially has a basis of polyvinyl chloride plastisol essentially free of volatile solvents and wherein the plastisol in said film-forming layer is subjected to gelling and fusing heat.

22. The method of claim 17 wherein said adhesive precursor layer is formed on said coherent polymeric film.

23. The method as in claim 22 wherein the coherent polymeric film forming layer as applied is essentially free of volatile solvents and wherein said applied polymeric film-forming layer is subjected to solidifying conditions.

24. The method of claim 22 wherein the coherent polymeric film-forming layer has a basis of polyvinyl chloride dispersion resin and plasticizer and wherein said film-forming layer is subjected to gelling and fusing heat.

25. The method of claim 1 wherein said coherent polymeric film layer is provided over only part of said carrier sheet and said adhesive precursor layer is applied to the coherent polymeric film as a dusting powder.

26. The method of claim 1 wherein each of said adhesive precursor layer and said coherent polymeric layer extends onto the release surface, said adhesive precursor layer being non-tacky where it extends outside said common area and said coherent polymeric layer forming no more than a weak bond to said carrier sheet where it is in contact therewith.

27. The method of claim 1 in which said coherent polymeric film in said common area comprises at least one discrete pattern and in which said carrier sheet is pellucid.

28. The method of claim 1 wherein said tackifier is substantially non-volatile under ambient conditions.

29. The method of claim 1 wherein said tackifier is substantially volatile under ambient conditions.

30. The method as in claim 1 wherein the adhesive precursor contains 50% to 100% by weight of a polymer.

31. The method of claim 1 wherein the migratory tackifier is a plasticizer for said coherent polymeric film and the ratio by weight of the film to the plasticizer is about 20:1 to 1:5.

32. The method of claim 1 wherein the adhesivve precursor layer contains a polymer different from the polymeric film and the migratory tackifier is a plasticizer for the polymers present in both said adhesive precursor layer and the coherent polymeric film layer.

33. The method of claim 32 wherein the ratio by weight of said coherent polymeric film to said plasticizer is about 20:1 to 1:5.

34. The method of claim 32 wherein the polymer contained in said adhesive precursor layer constitutes 50% to 100% thereof.

35. The method of claim 1 wherein the area of at least one of said layers is larger than said common area.

36. The method of claim 1 wherein the area of each of said layers is larger than said common area.

37. The method of claim 1, wherein said tackifier is compatible with both said adhesive precursor layer and said polymeric film.

38. The method of claim 37, wherein said tackifier is capable of migration as aforesaid without dependence on volatile solvent.

39. The method of claim 1 wherein said tackifier is a material that migrates through said adhesive precursor layer from the surface thereof opposed to said polymeric film to the opposite surface thereof, thereby rendering said opposite surface tacky.

40. The method of claim 1 wherein the coherent polymeric film-forming layer as applied initially is essentially free of volatile solvents and wherein the applied polymeric film-forming layer is subjected to solidifying conditions.

41. The method of claim 1 wherein the coherent polymeric film-forming layer has a basis of polyvinyl chloride dispersion resin and plasticizer and wherein at least said film-forming layer is subjected to gelling and fusing heat.

42. A method of producing an adhesive product as in claim 1 wherein said polymeric film and said adhesive precursor are capable of sustaining said migration of said tackifier to tackify said adhesive precursor at equilibrium without dependence on volatile solvent.

43. A method of producing an adhesive product as in claim 1 wherein the tackifying migration of said tackifier attains equilibrium in the absence of volatile solvent.

44. A method of producing an adhesivve product as in claim 1, wherein said tackifier is miscible in both said layers.

45. The method of claim 44 wherein said tackifier is capable of migration as aforesaid without dependence on volatile solvent.

46. A method of producing an adhesive product as in claim 1, wherein said tackifier is an ester of phthalic acid.

47. A method of producing an adhesive product, including the steps of forming plural layers on a release surface of a carrier sheet, the release surface being of the kind that develops only a weak readily releasable bond to a coherent polymeric film formed thereon, one of said layers being a coherent polymeric film extending over only part of the carrier sheet, and a further layer extending over and in contact with said film in a common area, said further layer also extending onto an overlap area of the carrier sheet adjacent said common area, said further layer as applied containing a volatile solvent and being of a formulation to become a non-tacky precursor of a pressure-sensitive adhesive in said overlap area when the solvent has evaporated, said coherent polymeric film containing a migratory tackifier for said further layer, said tackifier being present in said film initially in an amount sufficient to cause said further layer in said common area to be a tacky pressure-sensitive adhesive layer after essentially all of the solvent has evaporated and after the tackifier has migrated to equilibrium.

48. The product of any of claims 2-47.
* * * * *